(12) United States Patent
Wynne Willson

(10) Patent No.: US 6,765,544 B1
(45) Date of Patent: Jul. 20, 2004

(54) IMAGE PROJECTION APPARATUS AND METHOD WITH VIEWING SURFACE DEPENDENT IMAGE CORRECTION

(75) Inventor: Peter David Wynne Willson, London (GB)

(73) Assignee: Wynne Willson Gottelier Limited, Kent (GB)

( * ) Notice: Subject to any disclaimer, the term of this patent is extended or adjusted under 35 U.S.C. 154(b) by 296 days.

(21) Appl. No.: 09/692,417

(22) Filed: Oct. 20, 2000

(30) Foreign Application Priority Data

Sep. 8, 2000 (GB) .............................. 0022065

(51) Int. Cl.⁷ ................................................ G09G 5/00
(52) U.S. Cl. .............................. 345/6; 353/51; 359/197
(58) Field of Search ................. 345/6–9; 359/196, 359/197, 212, 206, 210, 223; 353/50, 51, 99

(56) References Cited

U.S. PATENT DOCUMENTS

| | | | |
|---|---|---|---|
| 4,663,698 A | | 5/1987 | Tomlinson |
| 5,793,340 A | * | 8/1998 | Morita et al. .................. 345/7 |
| 5,828,485 A | | 10/1998 | Hewlett |
| 5,982,525 A | | 11/1999 | Matsubara et al. |
| 6,099,128 A | * | 8/2000 | Jessl ............................ 353/51 |
| 6,144,483 A | * | 11/2000 | Allen et al. .................. 359/305 |
| 6,208,318 B1 | * | 3/2001 | Anderson et al. ............. 345/1.1 |
| 6,215,499 B1 | * | 4/2001 | Neff et al. ................... 345/419 |
| 6,219,093 B1 | | 4/2001 | Perry |
| 6,310,726 B1 | * | 10/2001 | Iizuka ......................... 359/618 |
| 6,409,350 B1 | * | 6/2002 | Kakimoto et al. ............. 353/85 |
| 6,443,576 B1 | * | 9/2002 | Nishida et al. ................ 353/98 |

FOREIGN PATENT DOCUMENTS

| | | | | |
|---|---|---|---|---|
| GB | 2 265 064 | | 9/1993 | ............ H04N/5/74 |
| JP | 07-5566 A | * | 1/1995 | |
| WO | WO 98/18037 | | 4/1998 | ............ G02B/26/10 |
| WO | WO 98/18040 | | 4/1998 | ............ G02B/27/28 |
| WO | WO 99/41544 | | 8/1999 | ............ F21V/17/02 |

* cited by examiner

Primary Examiner—Amr Awad
(74) Attorney, Agent, or Firm—Sterne, Kessler, Goldstein & Fox P.L.L.C.

(57) ABSTRACT

Lighting apparatus comprises (i) a deflector to deflect a light beam from a video projector in a plurality of directions, (ii) image processing means to process image information and comprising an input to receive raw image information from an image source, a processor to process the raw image information into processed image information, and an output to output processed image information to the video projector, and (iii) a controller that controls operation of the processor of the image processing means according to the status of the deflector.

9 Claims, 6 Drawing Sheets

$$\begin{vmatrix} x_1y_1 & x_2y_2 \\ x_3y_3 & x_4y_4 \end{vmatrix} \cdot f\{\delta x\, \delta y\, \delta z\} = \begin{vmatrix} x'_3y'_3 & x'_4y'_4 \\ x'_1y'_1 & x'_2y'_2 \end{vmatrix}$$

Fig. 7

IMAGE PROJECTION APPARATUS AND METHOD WITH VIEWING SURFACE DEPENDENT IMAGE CORRECTION

BACKGROUND OF THE INVENTION

1. Field of the Invention

This invention relates to image projection apparatus and to lighting apparatus for use in conjunction with image projection apparatus, in particular to apparatus for projecting dynamic images.

2. Related Art

In the entertainment lighting industry, wide ranges of apparatus are known for creating lighting effects with both static and movable and controllable spotlights and there are a host of devices for altering the output of these lights; these devices include diffusers, gobos and coloured glass and plastic filters. Video and slide projectors are also increasingly used to enhance the range of techniques available to designers of entertainment, promotion, advertising and corporate presentations.

WO 98/18040 describes a light projector and associated methods of achieving various effects.

A projector based upon an array of digital micromirrors is made by Texas Instruments Inc., of Dallas, Tex., USA, and U.S. Pat. No. 5,828,485 describes uses of such a projector in obtaining gobo effects.

A further device is known from WO 98/18037 in which a beam is reflected from a mirror and an image generator is moved in tandem with movement of the mirror so as to correct for distortion caused by the movement of the mirror.

Designers at the current time seek ever to introduce further innovation in the effects they achieve through new combinations of existing equipment and faster and more accurate control of that equipment.

SUMMARY OF THE INVENTION

The present invention seeks to provide and open up a new field of light and image projection, both using static and dynamic images, and thus including video projection as well as stage and other lighting effects.

Accordingly, the present invention provides, in a first aspect, lighting apparatus, comprising:

a deflector to deflect a light beam in a plurality of directions;

image processing means to process image information, comprising an input to receive raw image information, a processor to process the raw image information into processed image information, and an output to output processed image information; and a controller that controls operation of the processor of the image processing means according to the status of the deflector.

This apparatus is especially useful in combination with a video projector and an image source, designed for static projection of an image onto a viewing surface. In operation of one such known projector, data in an image source such as a graphics store is fed to the projector input, processed by the projector to form a projection beam and then projected. Focus and zoom controls are included on the projector as per usual. Using a personal computer (PC) an extensive range of images can be produced. The graphics store is typically in computer memory, in or adjacent the projector or remote from the projector, and used to store imagery, such as artwork, an image library, static and moving images, vector and bit map images, full-streaming video (VCR, Vcam), data output from a PC and the like. Suitable storage includes floppy disk, optical disk, DVD, mini-disk and videotape.

The present invention provides apparatus optionally in modular or kit form that modifies or updates existing video projection systems. The apparatus suitably has connections so as to intercept the data output from the graphics store, that is to say the input signal to the projector, optionally further process that data and then pass the data on to the projector. The apparatus includes a deflector which is positioned so as to deflect the light beam output from the projector. The deflector may as a side effect of deflecting the beam impart distortion to the image when its direction of projection is altered. The function of the image processor is to introduce a correction to the image data in anticipation of the distortion that occurs as a result of passing through the deflector. The function of the processor is optional in as much as the correction can be turned off or on according to the type of effect wanted. It is in addition optional to use the image processor deliberately to distort the image and/or to superimpose further and different effects upon the raw or corrected data. With knowledge of the video image desired to be seen on the viewing surface, the controller can direct appropriate processing by the processor according to the status of the deflector.

It is thus the case that the apparatus of the present invention enables a wide variety of effects to be achieved using known video projection equipment, effects not envisaged or imagined in design of the projectors. Projectors can be used dynamically to project images onto different viewing surfaces, switching from surface to surface and scanning images across surfaces whilst the apparatus continuously corrects for image distortions caused by movement of the deflector. Still and moving images can be moved like scenery without the need for heavy equipment or multiple projection systems.

The image processing means can comprise a first memory to store the raw image information and a second memory to store the processed image information. The contents of the second memory are then used for generation of the image by, for example, a projector.

In use, the deflector rotates an image in the projection beam as a consequence of deflecting the beam, and a function of the controller is to direct the processor to process the raw image information so as to provide a correction therefor in the processed image information. It is an advantage that as a result the projected video image can therefore remain upright.

It may further be necessary to correct keystoning of the image, introduced e.g. by a tilted single mirror or by the projection beam striking the screen at an angle, and a suitable correction may be achieved using a pair of prisms or a moveable lens which enable horizontal and vertical keystone to be corrected independently. Alternatively, keystoning maybe corrected by adjusting the image during or after image generation. Hence, it is further preferred that the apparatus is arranged such that when the deflector introduces a keystone effect into an image in the light beam the controller directs the processor to process the raw image information so as to provide a correction therefor in the processed image information. In apparatus that is especially preferred, there is provided the option that when the deflector both rotates an image in and introduces a keystone effect into an image in the light beam the controller directs the processor to process the raw image information so as to provide corrections for both distortions in the processed image information. In this way these two separate distortions are dealt with.

A particular apparatus of the invention also has means to correct the focus according to the direction of projection, and this correction is optionally achieved by moving an objective lens of the image projector. The correction may be calculated with reference to the distance from the image projector to the surface, and this distance may be measured using a distance detector such as an electronic range-finding device utilising the Doppler-shift effect, with a sensor mounted on the image projector. The focus correction may also be known from calibration of the equipment and pre-programmed so that when the deflectors of the apparatus are directed to deflect the beam in a given direction the distance to the viewing surface is known and the required focus adjusted according to a look-up table or similar. As will be appreciated by those in this art, the focusing means may be located in the path of the light beam between the projector and first light deflection means. Alternatively, the focusing means may be located in the path of the light beam between the first and second light deflection means. As another alternative, the focusing means may be located in the path of the light beam to focus the image deflected by the second light deflection means. The processor can thus be programmed in software so as to direct the status of the focusing means according to the status of the deflector. The controller may also direct the status of the focusing means according to the distance along the beam from the apparatus to a viewing surface. This enables dynamic changes in focus, through continuous feedback from a distance finder associated with the apparatus to the controller followed by output of an appropriate focusing signal, either to its own focusing means or to that of the projector, whilst the output of the projector is moved from one viewing surface to another. A further embodiment of the invention provides controlling inputs to a dynamic iris, preferably also by feedback to/from the controller.

Similarly, the apparatus can further comprise zoom control means, with the controller directing the status of the zoom control means according to the status of the deflector or the distance along the beam from the apparatus to a viewing surface. As with focus information, zoom signals can be output to zoom equipment of the apparatus or to external zoom equipment such as on a projector e.g. to maintain the desired image size or introduce special effects.

Preferably, the deflector has two moveable deflectors, mirrors are particularly suitable, so that the beam can be reflected in substantially any direction according to the respective positions of the mirrors. In apparatus described below in more detail, there is a first light deflection means arranged to rotate about a first axis and a second light deflection means arranged to rotate about a second axis substantially orthogonal to the first axis, and this is sometimes referred to as a double mirror head. The first and second light deflection means may also comprise first or second rotatable lenses. An advantage of a double-mirror type deflector is that the image remains orthogonal after being deflected, simplifying the correction(s) needed by the image processor e.g. to keep the image upright and free of keystone.

For ready use of the lighting apparatus with a projector, the apparatus can also include coupling means for securely coupling the lighting apparatus to a projector in such a position that the light beam output from the projector passes through the deflector of the lighting apparatus and so that the output of the image processing means of the lighting apparatus can be coupled to an input on the projector that receives image information of an image to be projected. The joining of a projector to this apparatus provides a system for light projection that greatly increases the uses and versatility of known projectors, providing a system with capabilities well beyond anything envisaged for a static projector. Inputs to the image processor and video projector are suitably in accordance with the DVI protocol.

A second aspect of the invention makes possible mechanical correction for rotation of an image by use of a double mirror head. Accordingly, apparatus of the second aspect comprises:

a deflector to defect a projection beam in a plurality of directions;

beam correction means to impart rotation of an image in the beam; and a controller that directs the degree of rotation imparted by the beam correction means according to the status of the deflector.

Image processing means can be included, to process image information, said image processing means comprising an input to receive raw image information, a processor to process the raw image information into processed image information, and an output to output processed image information, wherein the deflector introduces a keystone effect into the image and the controller directs the image processing means to process the raw image information so as to provide a correction for that keystone effect in the processed image information. In this way, there is mechanical rotation correction and software keystone correction.

As with the apparatus of the first aspect, focusing means can be incorporated into the apparatus so the controller directs the status of the focusing means according to the status of the deflector, or the controller can comprise an output for outputting focus information to a projector, and the apparatus can include zoom control means and the controller directs the status of the zoom control means according to the status of the deflector, or the controller comprises an output for outputting zoom control information to a projector according to the status of the deflector.

A third aspect of the invention provides apparatus in which the elements described above are incorporated into one apparatus rather than by combining together various individual units. Projection apparatus of the third aspect accordingly comprises:

image processing means to process image information and comprising an input to receive raw image information, a processor to process the raw image information into processed image information, and an output to output processed image information;

a beam generator to generate a light beam from the processed image information;

a deflector to deflect the light beam in a plurality of directions; and a controller that controls operation of the processor of the image processing means according to the status of the deflector.

Optional and preferred features of the apparatus of the first and second aspects, related to image processing, deflector(s), controller, focus control and focusing means, zoom control and zoom means, distance detection and others are similarly optional and preferred features of apparatus of the third aspects.

A fourth aspect provides light projection apparatus in which rotation correction is mechanical, and comprising:

a beam generator to generate a light beam a beam correction means to impart rotation of an image in the beam;

a deflector to deflect the light beam in a plurality of directions; and a controller that controls the rotation imparted by the beam correction means according to the status of the deflector.

Optional and preferred features of the apparatus of the first and second aspects, related to image processing, deflector(s), controller, focus control and focusing means, zoom control and zoom means, distance detection and others are similarly optional and preferred features of apparatus of the fourth aspects.

A fifth aspect of the invention provides a method of projecting an image in a light beam, comprising:

generating the light beam;

deflecting the light beam of a deflector, the deflector being moveable so as to deflect the beam in a plurality of directions, an effect of deflecting the beam being to rotate the beam; and prior to deflecting the beam, imparting a rotation of the beam to correct for the rotation caused by deflecting the beam.

An effect of deflecting the beam can be to change the distance from the deflector to a surface on which the image is viewed, and the method preferably comprises adjusting the focus of the beam according to the change in distance. A further effect of deflecting the beam can be to change the distance from the deflector to a surface on which the image is viewed, wherein the method preferably comprises adjusting the zoom of the beam according to the change in distance to maintain the image size on the screen. A still further effect of deflecting the beam can be to introduce a keystone effect into an image in the beam, wherein the method preferably comprises, prior to deflecting the beam, introducing a correction to the keystone imparted by the deflecting of the beam.

References to a projector are intended to include reference to projectors that include lenses and optical elements, projection engine components the output of which may be electrical. Suitable projectors may include cathode ray tubes, light valve technology, the Texas Instruments Inc. DLP (registered trade mark) projection engine relying upon a DMD (digital micro mirror, registered trade mark) chip, liquid crystal devices such as polysilicon LCD panels (P-Si), optionally with Micro-Lens arrays or other reflective LCD devices such as JVC's direct drive light amplifier (D-ILA).

Using the apparatus described, an image can be projected against a concave surface, such as the inside of a sphere in a specially designed viewing area with location for spectators proximal to the projector.

The apparatus can also be used to project an image onto a stage, such as a theatre stage, moving the deflector so as to move the image about the stage. One example of the invention in action comprises moving the beam so that it follows an actor as he or she moves about. A scene representing movement of an actor, say, in a car is readily achieved with projection of a static or moving background onto and around the actor; as the actor moves across the stage so the background may also follow the actor, resulting in a new and visually pleasing effect not achievable hitherto.

Another example of the invention in action comprises using apparatus to project an image onto the stage at a predetermined position, thereafter turning off the projecting means, or dimming or obscuring the output, moving the deflector and thereafter projecting an image, optionally a different one, at a second predetermined position. Use of the invention in this way reduces the need for separate lights for the separate images, or reduces the need for manual adjustments between projecting first and second images, offering a significant increase in flexibility for the operator. With the present invention it is possible to create effects that are quite different from and go far beyond presently available effects, in that dynamic video images can be projected onto and around, say, individuals on stage and tracked across the stage or across the viewing surface without distortion of the image. It is further possible to fade, rotate, shift or morph from one image to another, for example with one image superimposed on another for a part of the time between changing from one image to the next—all effects not achievable using known apparatus.

The present invention aims to provide novel means for moving an image over a surface and adjusting that image according to how it is moved over the surface, allowing for rotation, keystone, focus and zoom effects. Preferably, the lighting apparatus comprises first and second rotatable light deflection means for deflecting a light beam in different directions, the beam being deflectable by the first light deflection means on to the second light deflection means so as to deflect the beam in substantially any direction. Thus, for example, a double mirror-containing head is used to direct the beam in any direction, at the control of the operator. Data feedback from the head as to the relative positions of the mirrors can be used to calculate and control the degree to which a correcting rotation and/or keystone is introduced into the image. Alternatively, the head can be instructed to direct the beam in a given direction and knowledge of that direction and the resultant correction required can be used to control the degree of correction to be made.

By providing separate image rotation means, the degree of rotation of the image can be carefully controlled, and effects as described in more detail below achieved.

In particular, the apparatus may be used to project an image contained in the light beam in many directions. An image producing device, referred to sometimes as the object, may be placed in the optical path to shape the light beam produced by the light source, or a video image may be projected. As the pan and tilt in the double mirror head are rotated, the image projected by the apparatus moves spatially. However, if the image is projected, for example, horizontally and swept about a vertical axis, without a compensating rotation of the image by the image rotation means (the processor or the beam correction means) the projected image appears to rotate about the longitudinal axis of the beam. This would be problematic when the image is asymmetrical; for example, if the projected image is a face, the face would appear to rotate with the sweeping of the light beam. The present invention thus avoids this unwanted problem.

Preferably, the apparatus further comprises control means for controlling the rate of rotation of the image by the image rotation means. The control means may be arranged to calculate a required rate of rotation of the image by the image rotation means from the rate of rotation of each of the first and second light deflection means.

In a preferred embodiment, rotation of the image in one direction by the image rotation means is adapted to compensate for rotation of the image in the other direction due to deflection thereof by the first and second light deflection means. This can enable an asymmetric image to be swept by 360 by 360 degrees (global projection) with substantially no rotation of the image about the longitudinal axis of the beam, rotation of the image due to deflection thereof by the first and second light deflection means being automatically compensated by rotation of the image rotation means.

In use of the present invention, an asymmetric image, for example a video image, is moved over a viewing surface without rotation of the image perceived by the spectator. As a spectator watches, the image remains in an upright orientation. In addition to, or as an alternative to, eliminating any rotation of the image, the image rotation means may be arranged to introduce a desired rotation of the image. This can produce spectacular optical effects; for example, the projected image can be swept through a given angle and onto different angled surfaces at different distances from the object projector with substantially no rotation thereof, and then rotated through any chosen angle whilst the mirrors in the head remain still.

To maintain an image upright as it moves across a surface, the rotation of the image rotation means needed to compensate for rotation of the image due to deflection off the deflectors may be calculated from the respective movements of the first and second light deflection means. Alternatively, using appropriate software, the compensating rotation may be obtained from a pre-calculated look-up table. Another option is to use a correction as described in WO 98/18037. One mechanical option is that the image rotation means comprises a rotatable dove prism or other mechanical device or mirror equivalent. If so, the control means may be arranged to control the rotation of the dove prism about the longitudinal axis of the light beam.

The apparatus may further comprise beam generating means for generating the light beam and beam shaping means for altering the shape of the light beam to generate the image in the light beam. The beam shaping means may comprise a selective light reflecting or transmitting device. This can enable the shape of the image to be dynamically controlled. The light reflecting device can comprise a plurality of digitally controllable micromirrors, P-Si with a micro-lens array, D-ILA or any other suitable image delivery system.

The present invention also provides a method of projecting an image in a light beam by deflecting the beam using first light deflection means on to second light deflection means, and rotating both light deflection means so as to deflect the beam substantially in any direction, the method comprising the step of rotating the image in the light beam using image rotation means.

Preferably, the method further comprises the step of controlling the rate of rotation of the image by the image rotation means. The rate of rotation of the image by the image rotation means may be calculated from the rate of rotation of each of the first and second light deflection means.

Preferably, rotation of the image due to the deflection thereof by the first and second light deflection means is compensated by the rotation of the image by the image rotation means. In one preferred embodiment, the image rotation means comprises a rotatable dove prism.

A further aspect of the invention provides video image recording apparatus, comprising a video image recorder;

first and second rotatable light deflection means for deflecting light in different directions, the light being deflectable by the first light deflection means on to the second light deflection means; and image rotation means for rotating an image in the light;

wherein the first and second light deflection means can be so moved as to deflect light from substantially any direction through the image rotation means and into the video image recorder.

This confers the advantage that the video image recorder can be statically mounted but nevertheless used to record a video image emanating from substantially any direction. The recorder is preferably a video camera.

In a specific embodiment of the invention, the video camera is a security camera. The invention thus enables the security camera to be securely mounted whilst movement of the image rotation means and the light deflection means enable pictures from substantially any direction to be recorded. The camera itself can for example be mounted inside or behind a wall, and thus made more remote from and more secure from tamper. Using the image rotation means, whether electrical or mechanical, to compensate for rotation of the image due to deflection off the deflection means has the result that an upright image can be recorded whatever its origin relative to the stationary camera.

It is further preferred that the recording apparatus includes focusing and zoom control means according to the first and second aspects of the invention, to enable adjustment of focus and zoom according to the distance from the apparatus to the subject being recorded. In conjunction with focus and, or zoom control a distance detector can be provided for dynamic adjustment of these parameters.

BRIEF DESCRIPTION OF THE FIGURES

The invention is now described in specific embodiments with reference to the accompanying drawings in which.

DETAILED DESCRIPTION OF THE PREFERRED EMBODIMENTS

EXAMPLE 1

Double Mirror Head

Figure 1:
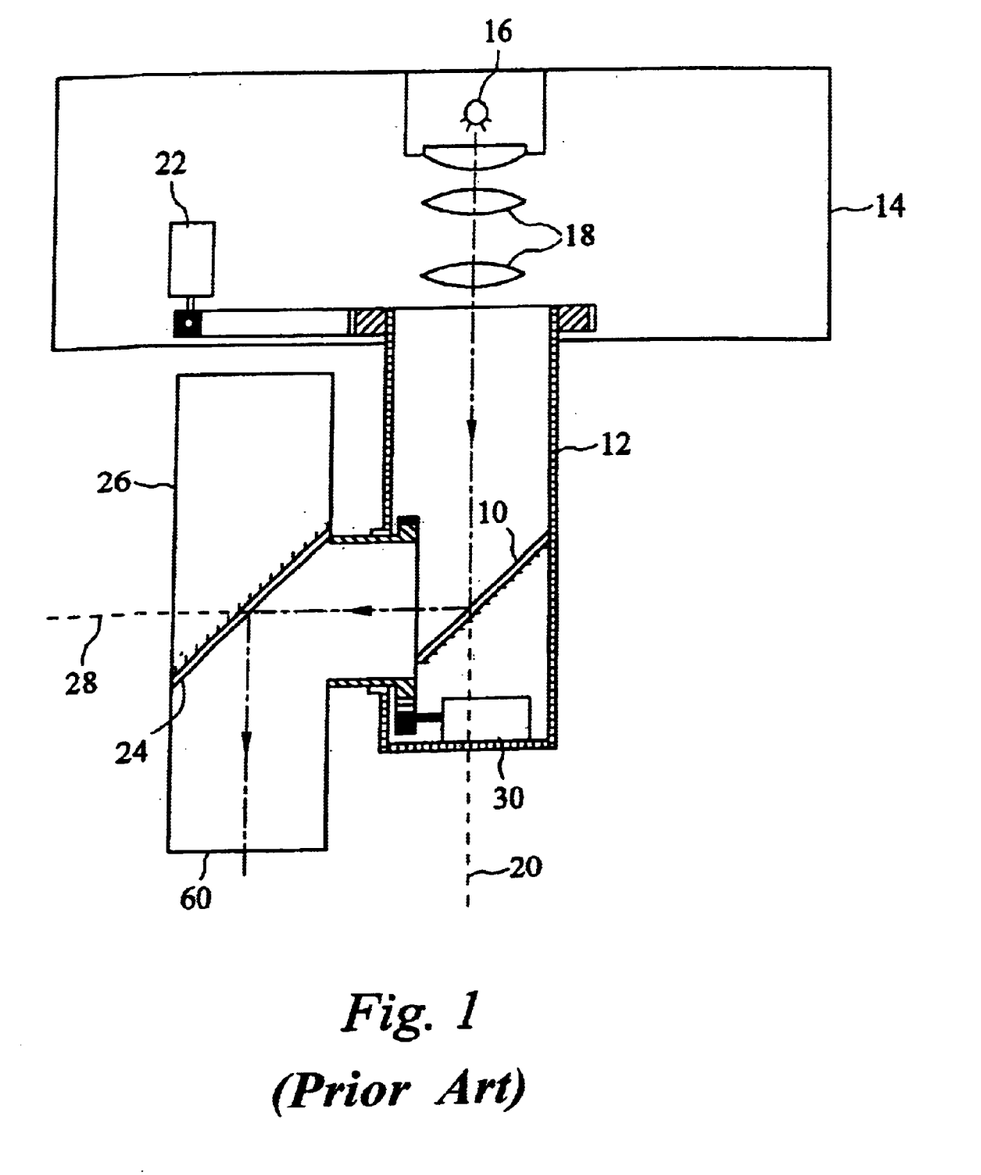
FIG. 1 shows a schematic view of a known beam steering apparatus.

Apparatus for directing a beam of light by rotatable mirrors is known from U.S. 4,663,698 and is illustrated schematically in FIG. 1. The apparatus comprises a first mirror 10 on a rotating first support, or "pan", 12 which is mounted to apparatus body 14. The body 14 includes a light source, such as a lamp 16, and focusing arrangement 18. Using a belt drive, the pan 12 is rotatable about pan axis 20 by a motor 22 mounted on the body 14.

A second mirror 24 on a rotating second support, or "tilt", 26 is mounted on the pan 12. Using another belt drive, the tilt 26 is rotatable about tilt axis 28, orthogonal to the pan axis 20, by a motor 30 mounted on the body 14. This arrangement of rotatable mirrors can direct a beam of light in many directions and is used for moving a white or coloured light beam. Beam steering apparatus using a pair of rotatable mirrors is also described in our co-pending International patent application no. WO 99/41544, the contents of which are incorporated herein by reference.

EXAMPLE 2

Image Projection Apparatus

Figure 2:
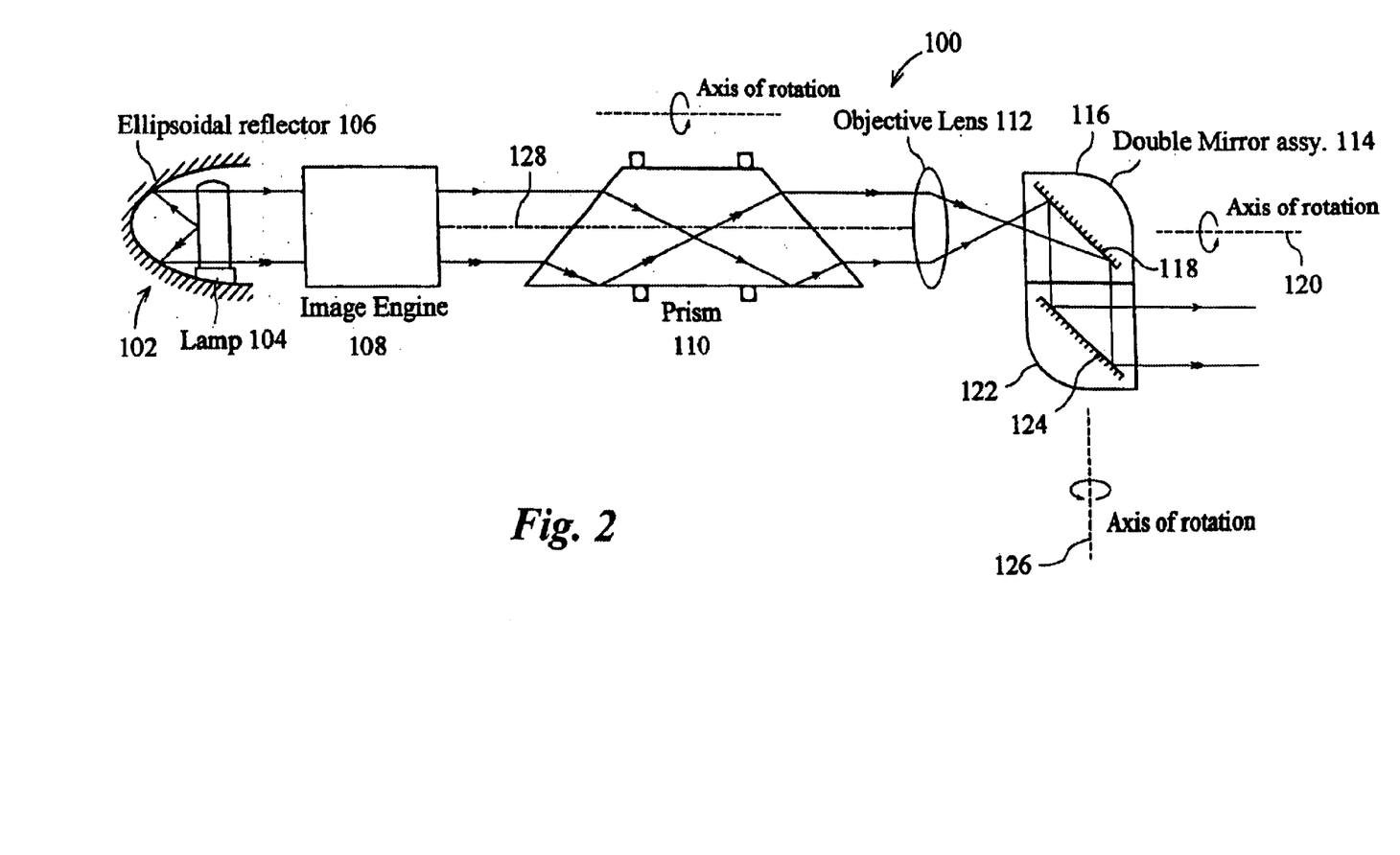
FIG. 2 shows the optical path in an embodiment of image projecting apparatus of the invention.

With reference to FIG. 2, the optical path of an embodiment of an image projecting apparatus is shown generally as 100. The apparatus comprises a beam source 102 for generating a beam of light. As shown in FIG. 2, the beam source 102 comprises a lamp 104 and an ellipsoidal (or other concave-shaped) reflector 106, the lamp 104 being situated at the focus of the reflector 106 to provide a broad, parallel beam of light. Instead of being a parallel beam, the beam may be converging or diverging, the apparatus including, if desired, suitable means for focusing the beam.

The light beam generated by the beam source 102 is incident upon an image generating engine 108, which alters the shape of the light beam to generate an image in the light beam. The engine 108 may take any suitable form; examples include a digitally controllable light reflecting device. Such a digitally controllable device is available from Texas Instruments, Inc., and typically comprises a plurality of digitally controllable micromirrors which are selectively moveable to either deflect light away from the optical path, in which case a dark region appears in the resultant projected image, or towards the optical path. Red, green and blue scales in the image can be obtained by the modulating the device at high speed, and moving a colour wheel in the light path. Typically, the micromirror device is operated at three times the normal speed and the resultant red, green and blue images are integrated by the human eye into a colour image.

The image output from the engine 108 is incident upon a dove prism 110. The prism 110, having a different refractive index to air, refracts the light beam as shown in FIG. 2, with the result that the image in the light beam is laterally inverted. The principle of the dove prism is well known and will not be discussed further.

The image output from the dove prism 110 is focused by objective lens 112 onto beam steering apparatus 114. In the embodiment shown in FIG. 2, the beam steering apparatus comprises a pan 116 including a first planar reflector 118, such as a mirror, the pan 116 being rotatable about pan axis 120.

A tilt 122 is mounted on the pan 116 and includes a second planar reflector 124, such as a mirror, and is rotatable about a tilt axis 126 substantially orthogonal to the pan axis 120 so that the mirrors can direct light in substantially any direction for projection through an aperture in the tilt 122. The planar reflectors, or parts thereof, may comprise a plurality of mirrors at different angles to each other, forming a mosaic of mirrors. At least part of one or both mirrors may comprise a diffuser. As an alternative to planar reflectors, the pan 116 and tilt 122 may include any suitable means for deflecting the light beam, such as lenses.

In addition to, or alternative to, the objective lens 112, one or more beam focusing means, such as lenses, may be arranged at any suitable point within or external of the beam steering apparatus 114.

As discussed above, if the image projected from the beam steering apparatus 112 is swept about, for example, a vertical axis, the image rotates about the longitudinal axis of the light beam due to the deflections of the image within the beam steering apparatus. In order to compensate for this rotation of the image, the dove prism 110 is rotated about axis 128 co-axial with the longitudinal axis of the light beam incident thereon. This rotation of the dove prism 110 has the result of rotating the image output from the dove prism 110. By co-ordinating the rate of rotation with the rates of rotation of the pan 116 and tilt 122, the rotation of the image by the dove prism 110 can compensate for the rotation of the image due to the deflections thereof within the beam steering apparatus 114.

The dove prism 110 may be rotated by any suitable means under the control of suitable control circuitry. The control circuitry is arranged to calculate the required rate of rotation of the dove prism 110 from the rates of rotation of the pan 116 and tilt 122. In addition to compensating for rotation of the image due to deflections thereof in the beam steering apparatus 114, rotation of the dove prism 110 may be separately controlled to produce a desired rotation of the projected image. Feedback from the beam steering apparatus 114 via a processor (not shown) to the image engine additionally provides correction in the image engine for keystoning introduced by the beam steering apparatus. Feedback as to the distance to a viewing surface is used to adjust the focus by objective lens 112.

EXAMPLE 3

Projection System

Figure 3:
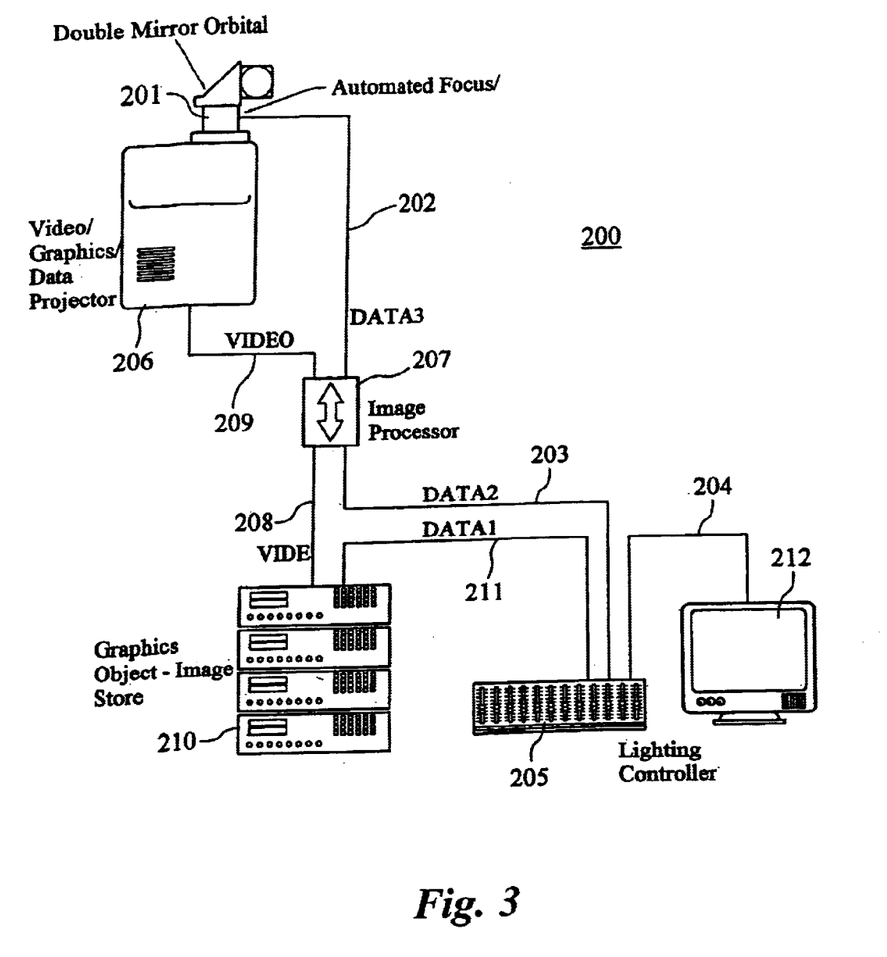
FIG. 3 shows a schematic diagram of a further embodiment of projection apparatus of the invention.

Referring to FIG. 3, a projection system 200 comprises a twin axis, double mirror, orbital head with universal mounting 201, focus and zoom mechanics incorporated within the head assembly (not shown), means for positional feedback to/from the orbital head, via DMX through link 202, to direct the head position and to feedback the position of the head, output and input via DMX through link 203 to/from a computer controller 205 having a Windows operating system embedded in a proprietary video-graphics software platform, and a controller 205. The apparatus is resident on a high specification, rack-mounting, PC with high capacity hard disks, and a S-VGA VGA, XGA, S-XGA, UXGA or higher resolution video graphics cards. A laptop computer-based lighting controller, or lighting desk, is also suitable with resident cueing index providing to images resident in the PC.

The double mirror head is shown coupled to the output of a video projector 206. The head incorporates focusing and zoom lenses, under control of motors whose operation is in turn controlled via inputs from the master controller. Motors to control the positions of the mirrors are likewise under control by the master controller and feed back is in place as to the position of the mirrors in the head from the head to the master controller.

Image processing means 207 has an input 208 for image data from the graphics store 210 and an output 209 for sending processed data to the projector 206. A separate input via DMX through link 203 receives instructions from the controller as to the processing to be carried out on the image data from the graphics store. The controller has an output 204 to a monitor 212 to enable the operator to see the effects being projected or to be projected in future. The controller has an input 202 from the head and an output to both the head and to the image processing means via link 203 and a separate RS232 link 211 with the graphics store 210. Ethernet and firewire type links are examples of industry-standards links for use in the invention.

In use, image data is provided to the image processing means from the graphics store in the PC. The controller directs a signal to motors of the head to effect an orientation of the mirrors of the head so as to deflect the beam from the projector in a chosen direction. Data as to the orientation of the mirrors is provided to the controller as a feed back to confirm their positions. The controller directs a processing signal to the image processing means, which processes the image data so as to introduce a correction for the expected rotation and keystone effects that are the result of passing through the double mirror head. The controller also directs a signal to the motors of the head that control focusing and zoom lenses on the head to ensure the projected image is at a desired focus and a desired zoom. The image is projected with desired orientation, focus, zoom and appearance. It is also possible for the controller to send instructions to the head and the image processor at the same time, in which case feedback from the head can be omitted.

Management of the images is carried out in a system using the following elements:

A library: This holds the images on a remote PC, one per head. There may be a very large number of these images. A way of searching for images using keywords via an external controller, one per system, can be incorporated.

An editor: This enables the user to open up any image and edit it accordingly. For example, it allows the user to add and edit text to library images.

A timeline: This provides a schematic representation of the sequences and acts as the backdrop upon which to hang the images, this element being the main point of interaction between user and apparatus.

A preview screen: In conjunction with the timeline, this provides a way of visualising the show. This preview screen can play through the sequence, applying the transformations in the sequence defined in the timeline.

Pre-programmed transforms: The majority of transformations are accessible from the user interface, any transformation which is envisaged as being often used is easily found and incorporated.

User-definable transforms: For users to create and incorporate their own transforms into the software and to have these accessible easily.

Control of the image via software is achieved, so that orientation, keystone/perspective correction, rotation, direction, speed and other manipulations are all be available via the graphics package resident in the rack-mounted PC's.

The head is controlled by 16-bit DMX 512 to 12-bit resolution driven by a hybrid stepper motor and driver. Smooth travel, accuracy, and repeatability preferably take priority over high speeds. A feedback interface optionally allows the image orientation to be synchronised to the position of the head.

Programmable focus is carried out by mechanics resident in the head assembly, and controlled by DMX. Integrated control is carried out from a laptop installed with proprietary lighting control surface. Another control method is to use a known desk, such as the Flying Pig Systems Wholehog (registered trademark) desk. Use of such a lighting control desk can also provide access to an image library, for selection and cueing of images and application of video effects.

EXAMPLE 4

Control Structure

The control structure includes two features, namely that both the focus and zoom attributes are wholly inclusive elements of the proposed control system, with attendant drive systems. Similarly, keystoning is also taken to be an independent operation of the video projector; although all three of these elements may be satisfactorily controllable via an interface to the chosen projector, that may not always be the case.

Principal User Interface (PUI)

This is made up of a traditional lighting desk, a computer based graphics engine and some form of image processor function (in this case a CPU) to combine the two and drive the head. A number of options exist for the processor, though it is preferred to incorporate as much of the processing functions in existing hardware (i.e. the PC graphics engine platform and the lighting desk).

Figure 4:
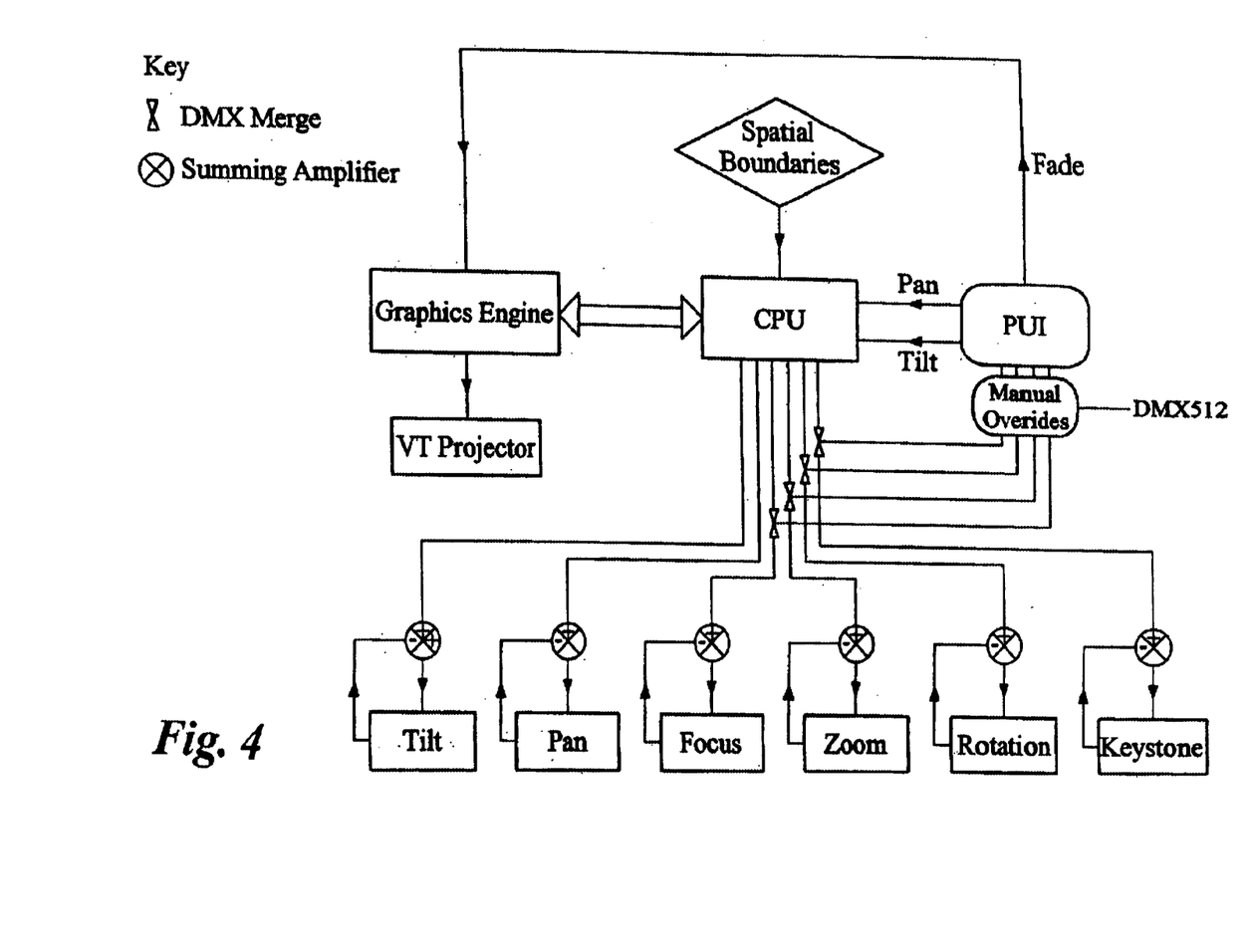
FIG. 4 shows a schematic control system.

There are three principle options available for the PUI, and whilst the following are quite different, they incorporate all the elements of the control system as depicted in FIG. 4.

Option 1: PUI—The Controller

In this option, the lighting desk is the controller with sole control of all attributes. As well as the primary output channels to control focus, zoom, pan and tilt there are also several dedicated data channels designed to call up pre-defined cues on the graphics engine. All input processing is thus a function of the desk, feedback is a closed loop system within the head.

Option 2: Attributes via CPU In this version all the attributes are a function of the CPU (the CPU also acting as the PUI) with a separate user interface combining attribute control and graphics editing. The show is programmed using trigger points at cue changes on the timeline that in turn are triggered by the lighting desk via DMX. The lighting operator thus has no direct control through the desk of any attributes other than blind programming the required triggers.

Option 3: Custom System

The final option is a completely standalone system that controls imageering, attributes and feedback with a suitable graphical user interface, also acting as the PUI. This system is programmed and operated independently of any other controllers, although it is possible to accept external triggers if used as part of a timecoded show.

Attributes

Figure 5:
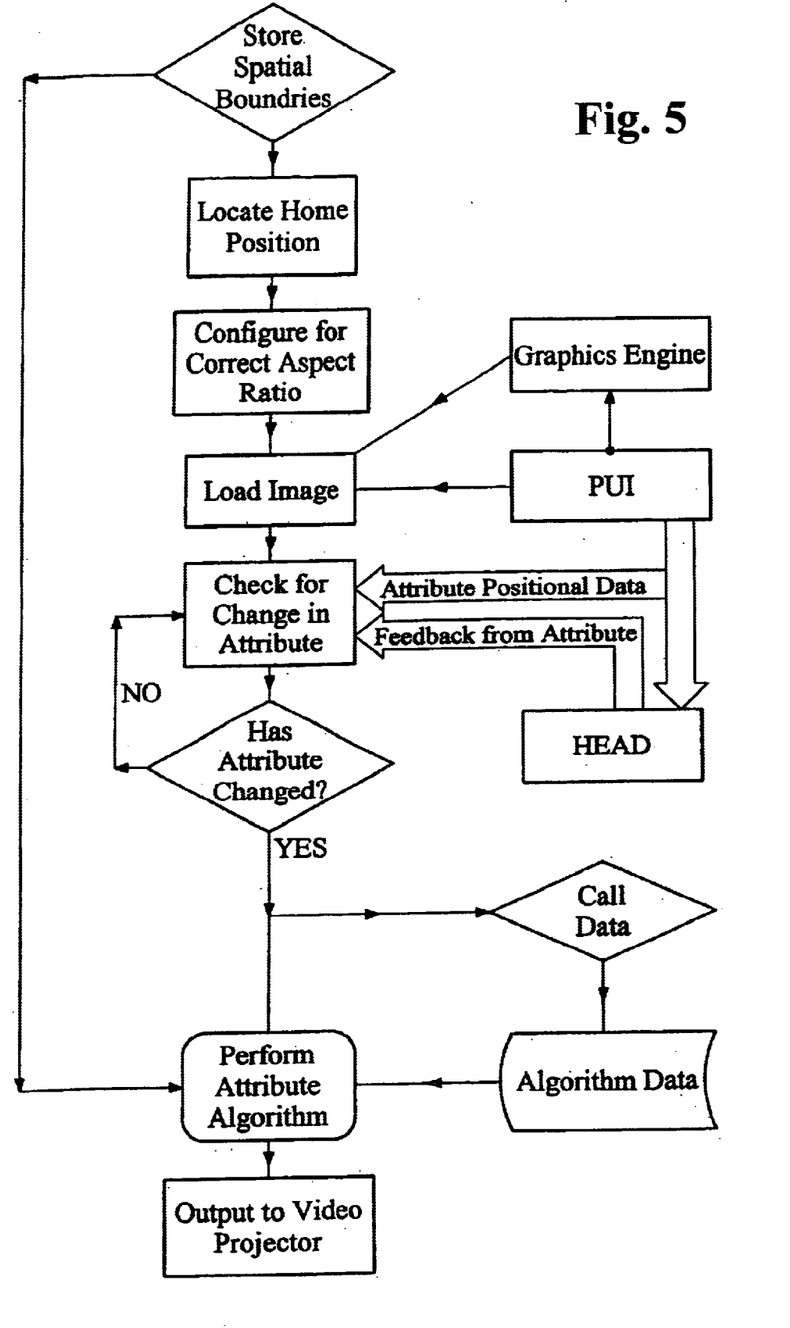
FIG. 5 shows a schematic diagram of operation of a projection system.

A description of the principle attributes is detailed below with reference to FIG. 5.

Tilt. The tilt operation is straightforward. Currently there is a 12 bit signal available where the control amplifier senses incremental or decremental values for direction. 12 bit resolution is thus available for both clockwise (T) and counter-clockwise (T') rotation.

Pan. The pan operation is slightly more complex due to the mechanical pan/tilt summation. Whilst the same is true for resolution and direction sensing to give 12 bit resolution for clockwise (P) and counter-clockwise (P') rotation, the tilt head also needs to rotate in the same sense and velocity as the pan head, if the pan is to rotate with no change in tilt position. This can either be a function of the CPU or an error correction level to the feedback circuit of the tilt.

Focus. There are three options available with focus (F). One is to use a simple pre-programmable focus which takes an Nbit data signal to give $\pm N\frac{1}{2}$bit resolution from an arbitrary mid-point. The second option is to use a mechatronic range finding system which uses an optical device to adjust focus, such as that found in a camera. In practice though, such a mechanism may prove to be ineffective when trying to focus on a uniformly coloured screen with no identifiable relief. The third option is to use the CPU to calculate focal position based on spatial information already input to the processor, and real time positional information from the PUI.

Zoom. Zoom is a straightforward attribute with control from the PUI. The control signal is again in the form of an Nbit data signal giving $\pm N\frac{1}{2}$bit resolution from an arbitrary mid-point.

Rotation. There are two options available for rotation (R) of the image. One is to perform an opto-mechanical transform based on the home position of the head and the default image orientation set in the imaging software. As the pan and tilt rotate the image is contra rotated to keep it in the correct orientation at all times. The second is to use a software algorithm to perform the same task based on default spatial coordinates.

It is also a requirement to have a manual override of rotation direction and speed in the PUI to give the flexibility to the designer of rapid image manipulation rather than relying on performing the task as a timed event through the image software. In this respect it is necessary to develop the positional matrix function and apply scalar multiplication based on the initial spatial coordinates and the revised 'MOVETO' position. It is necessary to add also any revised rotational information from the PUI to the MOVETO matrix.

Keystoning. Whilst it is possible to apply automatic correction using the spatial coordinates already input, it is a very rare occurrence to operate a show in a plain rectangular (or square) box with the stage at floor level. Thus any automatic correction would be invalid if the unit were projected on any surface other than the flat ceiling, walls or floor. It is a primary requirement therefore to adjust the K according to the surface projected onto at the time.

It is possible to set up a closed loop feedback using a four axis range finder but such technology and development is generally regarded as expensive in a system as described.

It is further possible to perform any correction automatically based on spatial coordinates and the MOVETO command, as it may need correcting depending on the plane of the projection surface. Such a tool is useful in straightforward sets and so it can be treated in the same manner as R with auto correction and manual override.

Figure 6:
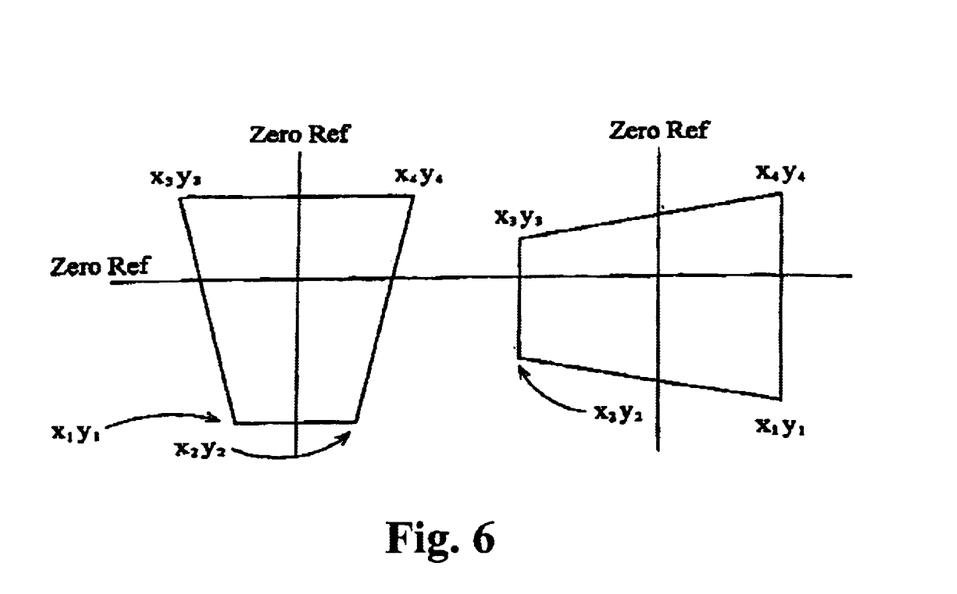
FIGS. 6 and 7 show calculation of keystone correction.

The output matrix to either the software or opto-mechanical K correction (whichever is chosen) is depicted in FIG. 6.

Figure 7:
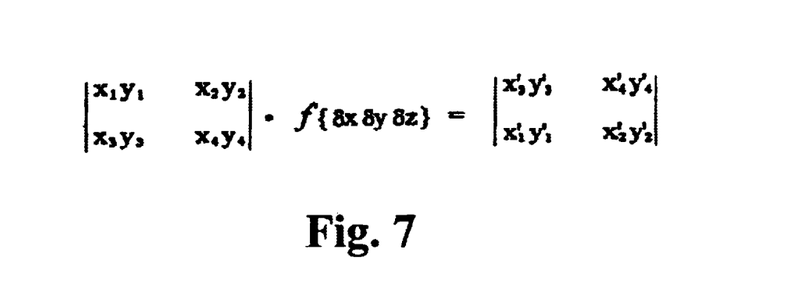

From the diagram it can be seen that around the zero reference datum a vertical correction requires adjustment of $-x_3+x_4$ and $-x_1+x_2$. Similarly, for a horizontal adjustment the correction needs to be $-y_3+y_4$ and $-y_1+y_2$. Using the following positional matrix a transformation can be applied either based on the angle of the pan and tilt axes or using a positional matrix derived from the MOVETO command, and the result output to the imageering software.

Where x'y' is the corrected value, and $\delta x$ $\delta y$ $\delta z$ are the change in locator from the spatial preset the function is as shown in FIG. 7.

Fade. The fade is a fairly straightforward function of the graphics engine. A single 8 bit channel gives smooth fading between full on (0xFF) and complete blackness (0x00). If the projector is run in RGBS or composite video the image software may not be able to cope with a fade to black—the options are then to use a mechanical dimmer which adds complexity or to fade to an external black burst generator.

Table of Functions Required

| Attribute | Function 1 | Function 2 | Function 3 | Function 4 |
|---|---|---|---|---|
| Pan | Rotate C (P) + 12 bit | Rotate CC (P') − 12 bit | | |
| Tilt | Rotate C (C) + 12 bit | Rotate CC (C') − 12 bit | Pan compensation* +/− 12 bit | |
| Focus | Increment + 4 bit | Decrement − 4 bit | | |
| Zoom | Increment + 4 bit | Decrement − 4 bit | | |
| Rotation | Increment + 12 bit | Decrement − 12 bit | | |
| Keystone | $x_1y_1$ | $x_2y_2$ | $x_3y_3$ | $x_4y_4$ |
| Fade | +/− 4 bit Full on + 8 bit | +/− 4 bit Full off 0 | +/− 4 bit | +/− 4 bit |

*Note that pan compensation is not strictly a function of tilt, but is highlighted to illustrate the correlation.

CPU and Image Handling

CPU Function. The CPU acts as the main processor for all the graphics functions, taking in the image and performing the required algorithms to achieve the desired output. The inputs comprise positional information, attribute override and graphics. The output is either graphics only if a remote PUI is used, or all six attributes plus graphics.

Feedback to the CPU is required giving actual status information of all six attributes so that a fast and accurate image:position calculation can be performed. This also has the benefit of accounting for any external errors that may occur.

Whilst such feedback is ideal, it is not strictly a requirement. When a MOVETO command is received, there is a calculable response time dependant on speed and final location of the command, and assuming that the system is satisfactorily damped, the control function for such a move (based on criteria such as inertia and input slope) can be applied to any image as a transformation speed. This applies to any image where the MOVETO command is a point to point command, i.e. move from $x_1y_1z_1$ to $x_2y_2z_2$. It would not be applicable to the duration of a continuous rotate, only the start and stop instruction.

CPU Speed. The CPU is capable of calculating the new positions of multiple attributes concurrently, or at least very fast, as well as performing processor intensive functions such as image rotation (should a software option be taken). An indication of the speed required could be gleaned from looking at the speed of the triggers. Assuming that the attribute commands come from the lighting desk which is outputting DMX512, and that no attributes are set to 'auto', the worst case would be as follows.

Video Imaging. There are two ways of calling up from the image bank. The first is to have a library of images or video clips accessible from the lighting desk. Each of the 0xFF bits of a channel could relate to 0xFF memory locations in the CPU which in turn contain an image such as a gobo or a video clip. The programmer would then call up said location as part of a cue.

The alternative is to use a channel or two as cue triggers; the images and clips are assembled as a show in themselves with each change of image given a marker on the timeline. Such markers would be activated on the change of state of the DMX channel, e.g., a change from 0xAA to 0xAB moves the image software to the next trigger mark.

Further variations and modifications will be apparent to one of skill in the art without departing from the spirit of the invention.

What is claimed is:

1. A lighting control system comprising:
   means for directing an image beam in a plurality of directions;
   an image source;
   an image processor capable of applying image corrections to images from the image source to provide an input from which an image beam is generated; and a computer controller having a user interface enabling a user to assign, for each of a plurality of beam directions corresponding to a series of desired image effects, an image correction such that the desired image effect is displayed on a viewing surface;

wherein the computer controller includes a schematic timeline, and wherein a user can pre-program a sequence of image beam movements and corresponding image transforms in a time sequence by defining cues on said timeline.

2. A system according to claim 1, wherein the means for directing the image beam comprises first and second moveable reflectors, the image beam being deflectable by the first reflector on to the second reflector so as to deflect the beam in a plurality of directions onto at least one viewing surface.

3. A system according to claim 1, wherein the computer controller includes an image transform store and wherein a user can select a pre-programmed image transform from said transform store to assign to a given image beam movement.

4. A system according to claim 1, wherein a user can define an image transform to assign to a given image beam movement.

5. A system according to claim 1, wherein the computer controller includes an image transform store and wherein a user can define an image transform to be stored in said image store.

6. A system according to claim 1, wherein the computer controller includes a look up table and wherein a plurality of image beam movements and corresponding image transforms can be stored in said look up table.

7. A system according to claim 1, further comprising a preview screen to provide a visualisation of an image transform to a user.

8. A system according to claim 1, wherein the image transforms include a rotation.

9. A system according to claim 1, wherein the image transforms include a keystone correction.

* * * * *